Figure 1:
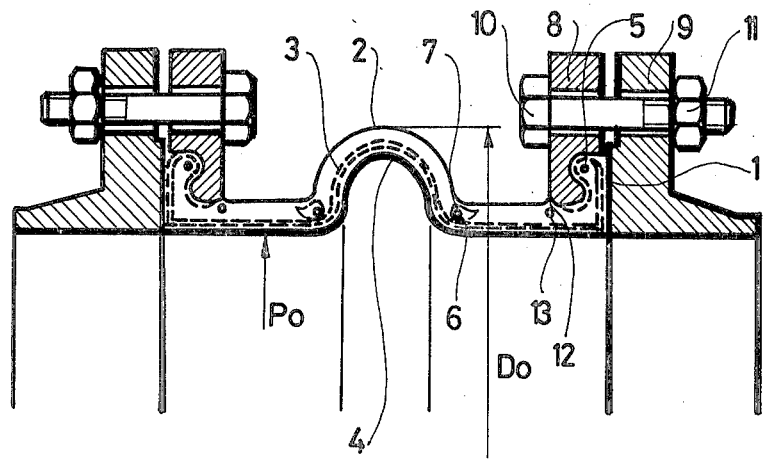

United States Patent [19]

Bartha et al.

[11] 4,186,949

[45] Feb. 5, 1980

[54] ELASTIC PIPE-CONNECTING COMPONENT FOR PIPES OR PIPELINES, OR THE LIKE

[75] Inventors: Zoltán Bartha; Péter Szór; József Haraszti, all of Budapest, Hungary

[73] Assignee: Taurus Gumiipari Vallalat, Budapest, Hungary

[21] Appl. No.: 898,984

[22] Filed: Apr. 21, 1978

[51] Int. Cl.² .................. F16L 27/10; F16L 51/02
[52] U.S. Cl. ............................... 285/226; 285/229
[58] Field of Search .......... 285/229, 226, 236, 235, 285/227, 228, 299–301, 53

[56] References Cited

U.S. PATENT DOCUMENTS

| | | | |
|---|---|---|---|
| 2,650,113 | 8/1953 | Brace | 285/226 X |
| 3,087,745 | 4/1963 | Rumbell | 285/226 X |
| 3,359,014 | 12/1967 | Clements | 285/229 X |
| 3,511,061 | 5/1970 | Burckhardt | 285/226 X |
| 3,666,296 | 5/1972 | Fischetti | 285/229 X |
| 3,979,142 | 9/1976 | Fujisawa | 285/235 |

FOREIGN PATENT DOCUMENTS

| | | | |
|---|---|---|---|
| 716359 | 1/1942 | Fed. Rep. of Germany | 285/229 |
| 1158776 | 12/1963 | Fed. Rep. of Germany | 285/229 |
| 1965410 | 7/1970 | Fed. Rep. of Germany | 285/229 |
| 2065110 | 8/1972 | Fed. Rep. of Germany | 285/229 |
| 1535569 | 8/1968 | France | 285/226 |
| 2092992 | 1/1972 | France | 285/229 |
| 2306605 | 10/1976 | France | 285/226 |
| 89088 | 9/1958 | Netherlands | 285/226 |
| 1188278 | 4/1970 | United Kingdom | 285/229 |
| 1192496 | 5/1970 | United Kingdom | 285/226 |

Primary Examiner—Mervin Stein
Assistant Examiner—Carl F. Pietruszka
Attorney, Agent, or Firm—Young & Thompson

[57] ABSTRACT

An elastic pipe-connecting component for pipes or pipelines or the like, comprises an elastic sleeve with flanges at each end and an annular expansion bulge in its midportion. In its undeformed condition, there is a cylindrical section on each side of the bulge, between the bulge and the portion of the component that is clamped to the pipe or pipeline. These exposed cylindrical portions are adapted to expand outwardly, to form two additional bulges, upon the imposition of pressure. To this end, they are reinforced with fibers of glass or steel or high strength synthetic, which are disposed at an angle to the axis of the component, of less than 55°. A desirably long component is thus provided, from a minimum of material.

2 Claims, 2 Drawing Figures

ELASTIC PIPE-CONNECTING COMPONENT FOR PIPES OR PIPELINES, OR THE LIKE

The subject of the invention is an elastic pipe-connecting component, containing one or more built-in strengthening layers, made of rubber or rubber-like plastic, for pipes, or pipelines, etc.

According to the present level of technical knowledge, there are various solutions known concerning elastic pipe-connecting components (having a compensating section) which can be fitted between two pipelines.

With these solutions it is a general intention to design such an expanding component that offsets the variations in length caused by temperature change, and the so-called alignment differences of the axis and provides the insulation of the straight sections of the pipelines against vibration, acoustic and electrical effects. Naturally the ideal solution of the problem would be, if the requirements described above could be met by using a design that can offer a high extension value with small structural length and, at the same time, can be easily mounted.

With the solutions presently known such a configuration is not known which can simultaneously satisfy the conditions of the high extension value and easy mountability.

There are, for instance, such solutions known where a framework, constituted by some high-strength fibrous material, is embedded in an elastic material and on its two ends a joining flange is fitted. The joining flange is then compressed to the pipe flange by a metallic rim. In the middle of the component, there is an expanding wave and a cylindrical section is formed on both its sides to facilitate mountability. With this solution a problem is presented by the fact that—in order to facilitate mountability—the cylindrical sections are covered by a jacket that is formed in one piece with the metallic rim clamping the flanges together. Such solutions are described in West German Pat. Nos. 2,002,555 and 2,065,110 (U.S. Pat. No. 3,666,296). Although this configuration is simple in respect of mountability, the metallic jacket formed in one piece with the metallic rim, however, constitutes an extraordinarily rigid structural part. A similar situation arises with such solutions where the cylindrical section is formed by a girdle made of a very thick fibrous material.

Mounting problems are presented, however, with such designs where the flange diameter is identical with that of the joining pipe flange, because they can thus be fitted only by using a two-section armature.

The above-mentioned solutions are outlined, for example, by the following patent descriptions: Nos. 3,363,918 (Italy) and 3,429,592 (USA).

There are also known such solutions where instead of one expanding wave two or more are used. But with these solutions the rigid cylindrical sections which provide easy mountability can also not be omitted at both ends of the component. This means that a compensating effect exceeding that of the known solution can be achieved only with greater structural lengths.

As can be seen from the foregoing, there is no solution known at the present level of technical knowledge that can satisfy all the requirements and, at the same time, can achieve an increased compensating effect and easy mountability without increasing the structural length.

The object of the invention is to form such an elastic pipe-connecting component that eliminates the disadvantages of the known solutions in such a way that it can allow a high compression, or expansion, etc. with a relatively small structural length, and offers an appropriate insulating effect, assuring, in addition, the possibility of easy mountability.

The above object can be achieved, according to the invention, in such a way that, while the section between the flanges placed on both ends of the component had in the prior art consisted of one or more expanding waves formed on the middle part and of a rigid cylindrical section extending to the flanges on both its ends, with the solution according to the invention the section between the flanges here also consists partly of an expanding wave formed at the middle, and, partly, instead of rigid cylindrical sections, of two additional sections which, during operation, are functioning also as expanding waves. It was then possible to find such a configuration where the rigid cylindrical sections were replaced by sections functioning like expanding waves and, in this way, the component is able to compensate significantly stronger effects, with the same lengths, than the solutions known hitherto. At the same time, because of this specific design of the elastic pipe-connecting component according to this invention, it can be much easier fitted between the pipelines.

The essence of the invention is that at both sides of the expanding wave formed at the middle of the elastic pipe-connecting component, rings are provided which are made of material of high strength, being advantageously embedded in the elastic material of the component, the subsequent cylindrical sections extend to the snap-flanges, protruding from the surface made of the material of the component, and at both ends of the component grooves are provided between the said snap-flanges and the overhanging flanges to accommodate the metallic rim, and, in addition, the said cylindrical sections contain cloth inserts where the direction of the strengthening fibers includes an angle less than 55° with the axis of the expanding component.

In practice, the component works so that the cylindrical section placed between the metallic rim snapped into the grooves between the snap-flanges and the main flanges, or, between the high-strength rings positioned after the middle expanding wave are able to expand along their section between the fixed diameters, because the strengthening fibers contained by them include an angle less than 55° against the axis of the expanding component. In this way these sections are able to work like additional expanding waves.

The elastic pipe-connecting component according to the invention can also be provided with more expanding waves by inserting more rings made of high-strength material and more cylindrical sections.

The snap-flanges protruding from the surface ensure that the metallic rim cannot move away from the main flange. The metallic rings have a double function in the invention, because, on the one hand they can be fitted between the pipelines, and, on the other hand, they contribute to the fact that the cylindrical section can be formed as expanding waves. In special cases a reinforcement can be placed under the snap-flanges for the sake of eliminating the change in diameter and of increasing the function of the metallic rim.

Figure 2:
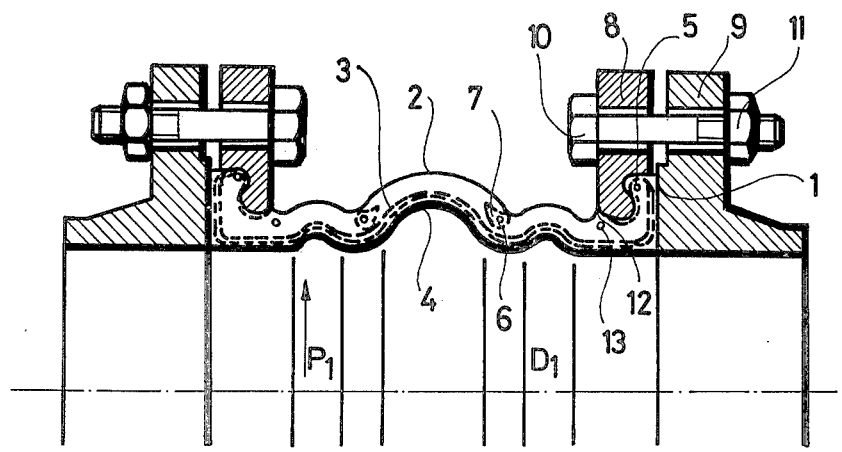

The invention can be more clearly understood by viewing the following figures:

FIG. 1 illustrates the component according to the invention, in cross-sectional view, in inoperative state; and FIG. 2 illustrates the above elastic pipe-connecting component, in cross-sectional view, in operation.

It can then be seen in FIG. 1 that the elastic pipe-connecting component of the invention contains the reinforcing insertions made of metallic layers or some synthetic fiber, in particular cases, of metallic or glass fibers 3 between the external and the internal natural, or synthetic-rubber layers 2,4. When choosing the material for the external and the internal layers 2,4 the chemical effect of the flowing medium must also be taken into account. The reinforcing insertions 3 are bent over around the end rings 5 and that is how the flange is formed. The internal cover has to be bent up to the greatest diameter of the flange 1 as it should cover the whole surface that provides the packing.

The rings 6 made of metal or some other high-strength material create the individual sections, and, in consequence, form the external expanding waves. To prevent the possible displacement of the component during the operation after construction (cambering, vulcanization) the rings 6 could be fitted with protuberances 7.

The snap-flanges 12 on the end of the cylindrical sections assure that, when assembled, the flanges 8 can be rotated, so being brought to the appropriate position and maintained later in this position. The reinforcing inserts 13 can be in special cases positioned under the snap-flanges 12.

During assembly the elastic connecting component will be positioned by means of the flanges 8 snapped in position between the pipe flanges 9 and the snapped flange 8 is rotated around its axis so that the axis of the bolt holes will be in alignment with the axis of the bolt holes of the pipe flanges and the bolt 10 is fitted, with the head towards the expanding wave--and this will be firmly fastened by means of the nut 11.

Thus, an annular wave forms on the two cylindrical sections under the effect of the internal pressure, the diameter of which is greater than the original diameter of these sections. In the meanwhile the diameter of the middle expanding wave is decreasing. This solution has an advantage compared to the solutions hitherto used that, instead of one expanding wave, three waves are able to take up the length of the expansion, yet without the necessity of increasing the structural length of the component.

With the known solution the stiffening girdle applied on the cylindrical sections is not used for the solution as defined by the invention. The lack of this feature facilitates very much the lateral displacement, i.e. the error being presented by the deflection, caused by the inaccuracy in mounting, can be easily compensated by the solution as defined by the invention. The advantages described in detail hereinbefore can be accomplished so that, in addition, the mountability is also essentially facilitated by the specific design of the component.

What we claim is:

1. An elastic component containing reinforcing fibers, having a pair of radially outwardly extending end flanges and snap-flanges disposed endwise inwardly from said radially extending flanges thereby to define a groove between said radially extending flanges and said snap-flanges for the reception of rings by which each end of the component is secured to an adjacent pipe or pipeline or the like, said component having an outwardly extending annular bulge at its midportion and a locally reinforced cylindrical portion on each side of said bulge between said bulge and the adjacent said snap-flange, in the undeformed condition of the component, said fibers being disposed at an angle less than 55° relative to the axis of the component whereby, upon the imposition of internal pressure to the component, said cylindrical portions of the component can form two additional radially outwardly extending bulges.

2. A component as claimed in claim 1, and annular reinforcing rings embedded in said component on each side of the first-mentioned bulge between the first-mentioned bulge and said cylindrical portions.

* * * * *